United States Patent [19]
Bissonnette

[11] Patent Number: 5,239,352
[45] Date of Patent: Aug. 24, 1993

[54] MULTIPLE SCATTERING TECHNIQUE (MUST) LIDAR

[75] Inventor: Luc R. Bissonnette, Ste-Foy, Canada

[73] Assignee: Minister of National Defence of Her Majesty's Canadian Government, Canada

[21] Appl. No.: 799,431

[22] Filed: Nov. 18, 1991

[51] Int. Cl.⁵ ............................................. G01C 3/08
[52] U.S. Cl. ........................................ 356/4; 356/28; 356/28.5
[58] Field of Search ................. 356/4, 28, 28.5

[56] References Cited

U.S. PATENT DOCUMENTS

| | | | |
|---|---|---|---|
| 4,003,655 | 1/1977 | Wasilko | 356/4 |
| 4,306,500 | 12/1981 | Castanieh et al. | 356/4 |
| 4,634,272 | 1/1987 | Endo | 356/5 |
| 4,927,263 | 5/1990 | de Groot et al. | 356/5 |
| 4,979,816 | 12/1990 | White | 356/4 |
| 5,047,653 | 9/1991 | Garcia et al. | 356/28.5 |
| 5,076,687 | 12/1991 | Adelson | 356/4 |

OTHER PUBLICATIONS

"Stable analytical inversion for processing lidar returns" by James D. Klett, Applied Optics, 15 Jan. 1981.
"Sensitivity analysis of lidar invention algorithms" by Luc Bissonnette, Applied Optics, 1 Jul. 1986.
"Lidar inversion with variable backscatter/extinction ratios" by James D. Klett, Applied Optics, 1 Jun. 1985.
"Cloud extinction profile measurements by lidar using Klett's inversion method" by Carnuth et al, Applied Optics, 1 Sep. 1986.
"Vertical atmospheric profiles measured by lidar" by G. J. Kunz, Applied Optics, 1 Jul. 1983.

*Primary Examiner*—Mark Hellner
*Attorney, Agent, or Firm*—Larson and Taylor

[57] ABSTRACT

A lidar with a laser transmitter for transmitting a laser beam and a receiver having receiving optics for detecting radiation reflected back from the beam by aerosol particles in the atmosphere, the receiver having an optical axis aligned with the beam. The receiver includes a number of radiation receiving elements such as concentric radiation detector elements placed in the receiving optics focal plane so that these concentric detector elements can measure backscatter radiation from the beam at several fields of view simultaneously. Backscattered signals at fields of view larger than the laser beams's divergence are due to multiple scattering. The unknown backscatter coefficient can then be eliminated by ratioing the lidar returns at the different fields of view.

20 Claims, 1 Drawing Sheet

MULTIPLE SCATTERING TECHNIQUE (MUST) LIDAR

FIELD OF THE INVENTION

The present invention relates generally to an apparatus for measuring the attenuation of visible or IR radiation transmission in the atmosphere, which attenuation is caused by aerosols or particles in suspension, and in particular to a backscatter lidar for measuring that attenuation.

BACKGROUND TO THE INVENTION

Aerosols or particles in suspension are the main source of attenuation of visible and infrared transmissions through the atmosphere. This has serious implications for many activities which range from landing aircraft to very sophisticated electrooptic applications for both military and civilian activities. A major difficulty with aerosols is that they are subject to large temporal and spatial fluctuations which make forecasting impossible and point measurements inadequate. Therefore, it is often necessary to continuously monitor the aerosol extinction over the complete spatial domain of interest in applications where their effects are potentially critical. This may mean, for example, measuring the aerosol extinction coefficient at a large number of points along the glide path of a landing aircraft because of important changes that occur with altitude.

The backscatter lidar has long been proposed to remotely measure atmospheric parameters since it has the required spatial and temporal resolutions and has proved very efficient in such specialized tasks as determining the concentration of trace gases. However, conventional lidar techniques have limitations and provide an unreliable technology to determine aerosol extinction coefficients since the measured backscatter signal is a function of two unknowns, i.e. the backscatter and the extinction coefficients.

Conventional lidar measurements alone, are insufficient to determine either one of these. Additional, independent, information on the nature of the aerosols and a consistent boundary value are necessary in order to resolve the indeterminacy. This would require additional measurements. Moreover, the lidar equation is nonlinear and its solutions are subject to instabilities. Furthermore, the standard lidar approach ignores the influence of multiple scattering.

SUMMARY OF THE INVENTION

It is an object of the present invention to provide a modified backscatter lidar which can overcome the above-mentioned difficulties by, in addition to conventional lidar techniques, also measuring multiple scattering contributions. This additional information can then be used to resolve the indeterminacy which was previously described. Any backscattered signal at a field of view larger than the laser beams divergence is due to multiple scattering. Therefore, additional information obtained by measuring backscatter at several fields of view simultaneously can be used to determine multiple scattering contributions to the received signals. This is accomplished, according to the present invention, by using a multi-element radiation detector with radiation receiving elements located in separate sections of the focal plane of the lidar's receiving optics in order to differentiate the received backscattered radiation between several fields of view.

BRIEF DESCRIPTION OF THE DRAWINGS

The following detailed description of the invention will be more readily understood when considered in conjunction with the accompanying drawings, in which.

DESCRIPTION OF THE PREFERRED EMBODIMENT

Figure 1:
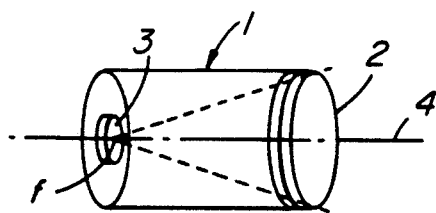
FIG. 1 is a transparent perspective view of a lidar's receiver which is provided with a radiation detector according to the present invention.
Figure 2:
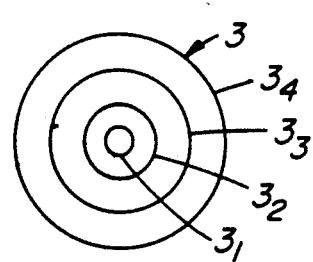
FIG. 2 is an enlarged front view of the detector shown in FIG. 1.

FIG. 1 illustrates a receiver 1, in cross-section, for a lidar according to the present invention. In that receiver, a multi-element radiation detector 3 is located in the focal plane "f" of the receiving optics 2. The detector 3, as shown in more detail in FIG. 2, consists of a number of concentric circular silicon detectors (PIN photodiodes) $3_1$, $3_2$, $3_3$, and $3_4$. This multi-element detector can, as a result of four separate detector elements, differentiate received backscattered radiation signals between several fields of view. A backscattered signal received for any field of view larger than the divergence of the lidar's laser beam is due to multiple scattering.

In one particular embodiment of the invention, the lidar's laser transmitter (not shown) is a pulsed Q-switched Nd:glass laser whose transmission is at 1.054 $\mu$m. This laser has a typical output energy $\approx$ 1J per pulse at a repetition rate of 0.1–0.2 Hz with a pulse duration of 25 ns. The laser's beam divergence from the transmitter is between 4 and 5 mrad. The laser transmitter is mounted on top of the receiving telescope 1 with the beam being centered on and aligned with the telescope axis by means of steering mirrors. The complete transceiver assembly for this embodiment is attached to a scanner device that can point the lidar from $-5°$ to $+90°$ in elevation and from $-45°$ to $+45°$ in azimuth.

The receiver's optics consist of a 105 mm diameter f/1.33 lens assembly 2 with the multi-element detector 3 being located in the focal plane of the lens assembly. The multi-element detector 3 consists of four concentric silicon detectors (PIN photodiodes) $3_1$, $3_2$, $3_3$, and $3_4$ with active areas having diameters of 1.5, 5, 10 and 15 mm, respectively. These active areas are electrically insulated from each other with each area being separated by a gap of 0.127 mm from adjacent areas. The uniformity of response for this detector is better than 5% over its entire surface with each element having a rise time of less than 35 ns. These detector elements $3_1$, $3_2$, $3_3$, and $3_4$ define nominal fields of view (half-angle) of 0–3.75, 3.75–12.5, 12.5–25 and 25–37.5 mrad, respectively when positioned at the focal plane "f" of the lens assembly 2.

The proposed method starts with ratioing the lidar returns at the different fields of view. This eliminates the unknown backscatter coefficient and has the advantage of requiring no instrument calibration. The only requirement is that the detector sensitivity is relatively uniform, or at least known, over all of its elements. Through theoretical analysis of the multiple scattering effect on lidar returns, it has been found that the received power from range R at two different fields of view $\Theta_1$ and $\Theta_2$ is given, to a good approximation, by a nonlinear polynomial of the aerosol scattering coefficient $\alpha_s(R)$ at range R, the scattering optical depth $\delta_o^R \alpha_s(r)dr$ and the field of view angles $\Theta_1$ and $\Theta_2$. Given this relation and the measured lidar backscatter at two or more fields of view, the aerosol scattering coefficient $\alpha_s(R)$ can be solved, for all ranges R of the lidar signals, by starting at the nearest range and proceeding forward. The solution algorithm is the straight forward least-squares method. No boundary value is necessary and it has been found that noisy data produces no instabilities. This type of technique works wherever the aerosols are dense enough to make multiple scattering contributions measurable, i.e. under conditions of haze or fog.

Figure 3:
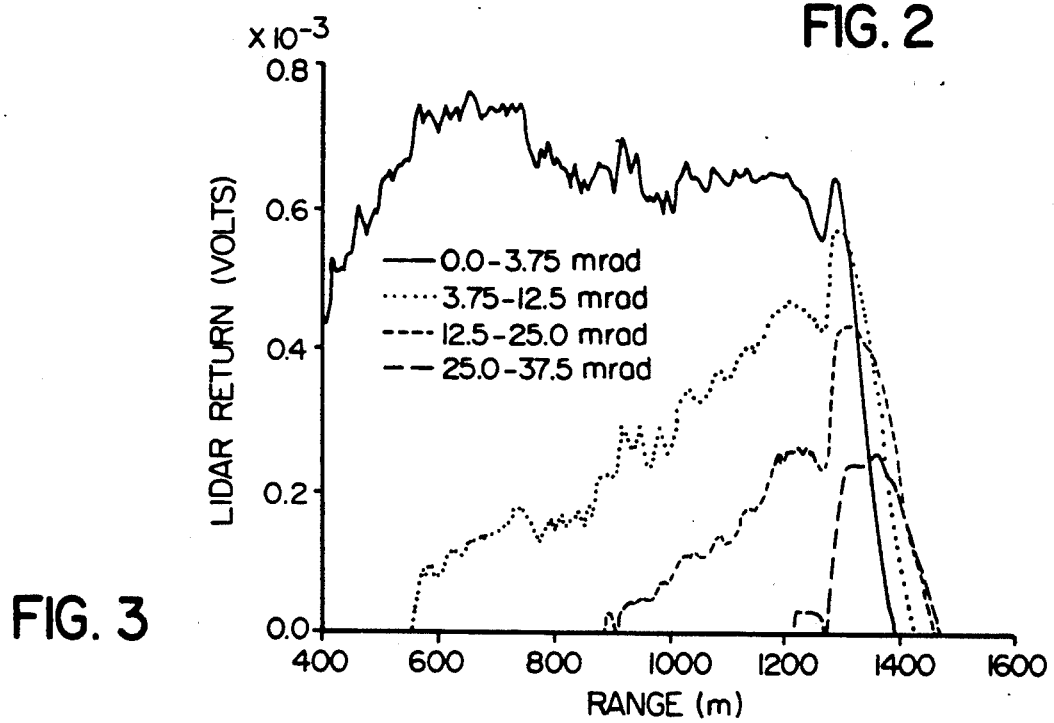
FIG. 3 shows graphs of simultaneous lidar signal returns measured at four fields of view for a laser transmitter aimed at 90° elevation into broken clouds.

FIG. 3 shows graphs of lidar received signals measured simultaneously by each of the four detectors for a laser transmitter aimed at 90° elevation into broken clouds following a light rainfall. The curve labels are for half-angle fields of view. The receiver's axis is coincident with the laser axis so that only the central detector with a 7.5 mrad full angle field of view should, neglecting multiple scattering contributions, provide a signal since that field of view completely encompasses the unscattered laser beam which has a maximum divergence of 5 mrad. Initially, as expected for shorter ranges, the signal is zero for the outer ring detector elements. The multiple scattering effect gradually broadens the beam into the outer fields of view as the range increases and a backscatter return signal begins to appear in each of the outer detector rings $3_2$, $3_3$, and $3_4$ in succession. The returns measured by the outside rings $3_2$, $3_3$, and $3_4$ overtake the conventional lidar return signal as measured by central detector $3_1$ with deeper propagation into the cloud.

Figure 4:
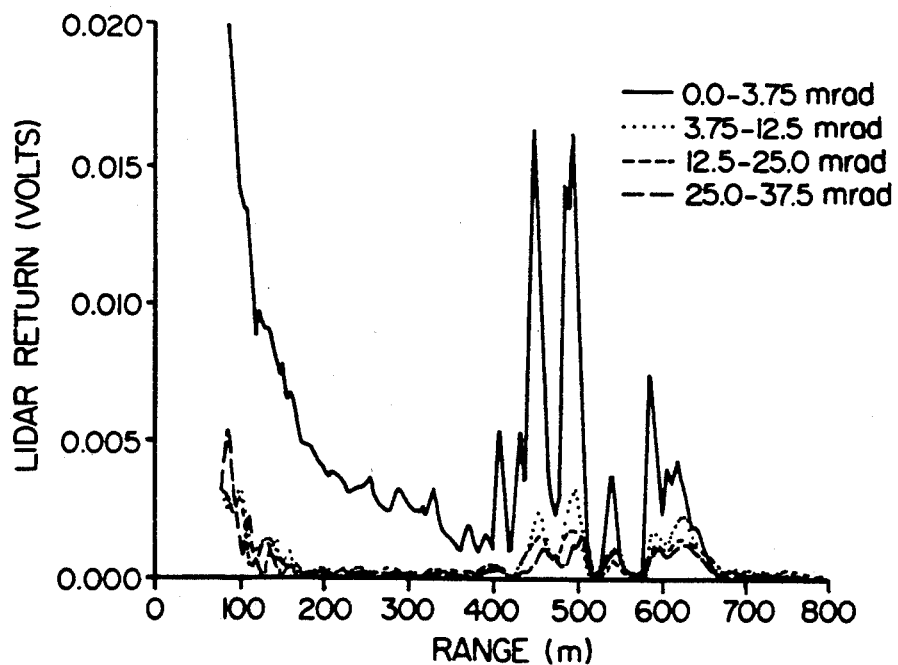
FIG. 4 shows graphs of simultaneous lidar signal returns measured at four fields of view for a laser transmitter aimed at 11.5° elevation into a ground fog layer.

FIG. 4 shows graphs of received signals measured by each of the detectors when the laser transmitter is aimed at 11.5° elevation into a ground fog layer. In the first 400 m range there is some evidence of multiple scattering but the single scattering signal measured by $3_1$ dominates in what appears to be a layer of approximately uniform density. Starting at about 400 m, large density fluctuations and the appearance of multiple scattering begin to be displayed in the graphs. The multiple scattering contributions are well correlated to the single scattering return, their being a gradual buildup with optical depth. The ratio of the signal measured by the first ring detector $3_2$ to that measured by the central detector $3_1$ is about 15% at the first important peak near 450 m, for example, whereas that ratio is more than 50% at 625 m. There is eventually a crossover at the trailing edge of the return signals but this is not as pronounced as in FIG. 3.

Normally, it would not be possible to determine whether the rapid drop in signal strength at the 1400 m altitude in FIG. 3 is due to a clear air boundary or extinction in a conventional operation of a lidar, i.e. with only a single central detector being used. However, the multifield-of-view-curves in FIG. 3 clearly indicate that the drop in signal strength at the 1400 m altitude is due to extinction. If it were clear air causing the drop, the signals measured in the outer fields of view could not last longer than that measured by the central detector, i.e. they would all drop more or less simultaneously. This is quite evident in FIG. 4 where it is shown that all curves go to zero, or very close to zero, simultaneously at 520 and 570 m between layers of high densities. This clearly illustrates that the measured multiple scattering contributions provide additional independent information on the aerosol medium which can be used, for instance, to help estimate the far-end boundary value. The simultaneous detection at different fields of view constitutes a convenient means of measuring the multiple scattering contributions to lidar returns in order to determine the aerosol scattering coefficient for all ranges R of the lidar signals.

Various modifications may be made to the preferred embodiment without departing from the spirit and scope of the invention as defined in the appended claims. For instance, light receiving elements such as optical fibers may be located in the receiving optics focal plane which then direct the received radiation to appropriate radiation detectors.

The embodiments of the invention in which an exclusive property of privilege is claimed are defined as follows:

1. A lidar including a laser transmitter for transmitting a laser beam and a receiver having receiving optics for receiving radiation reflected back from the beam by aerosols and particles in the atmosphere; the beam being aligned with the optical axis of the receiver and the receiver being provided with a plurality of separate radiation detectors, said radiation detectors comprising a central radiation receiving element and further radiation receiving elements located in separate annular sections of the focal plane of the receiving optics that are concentric with said central radiation receiving element, with radiation received in each annualar section being effectively directed to a separate detector.

2. A lidar as defined in claim 1, wherein the radiation receiving elements comprise optical fibers which direct received radiation to associated radiation detectors.

3. A lidar as defined in claim 1, wherein the radiation receiving elements comprise a circular central radiation detector element surrounded by at least one ring shaped radiation detector element, the detector elements being concentric.

4. A lidar as defined in claim 3, wherein each detector element is separated from adjacent elements by a gap.

5. A lidar as defined in claim 4, wherein the detector elements have a uniformity of response of better than 5% over their entire surface.

6. A lidar as defined in claim 5, wherein the detector elements are silicon photodetectors.

7. A lidar as defined in claim 6, wherein the detector elements are PIN photodiodes.

8. A lidar as defined in claim 7, wherein the central circular detector element has a field of view that is larger than the laser beam's divergence.

9. A lidar as defined in claim 7, wherein three concentric ring shaped detector elements surround the central detector.

10. A lidar as defined in claim 3, wherein the central circular detector element has a field of view that is larger than the laser beam's divergence.

11. A lidar as defined in claim 10, wherein each detector element is separated from adjacent elements by a gap.

12. A lidar as defined in claim 11, wherein the detector elements have a uniformity of response of better than 5% over their entire surface.

13. A lidar as defined in claim 12, wherein the detector elements are silicon photodetectors.

14. A lidar as defined in claim 13, wherein the detector elements consist of four concentric detectors with active areas having diameters of 1.5, 5, 10 and 15 mm, respectively which, through the optics, provide nominal half-angle fields of view of 0 to 3.75, 3.75 to 12.5, 12.5 to 25 and 25 to 37.5 mrad, respectively.

15. A lidar as defined in claim 14, wherein the laser beam's divergence is between 4 and 5 mrad.

16. A lidar as defined in claim 15, wherein each detector element has a rise time of <35 ns.

17. A lidar as defined in claim 16, wherein the receiving optics are part of a telescope, the laser transmitter being mounted on the telescope with the laser beam being centered on and aligned with the optical axis by means of steering mirrors.

18. A lidar as defined in claim 17, wherein the laser transmitter transmits a beam at 1.054 $\mu$m.

19. A lidar as defined in claim 18, wherein the laser transmitter and telescope assembly are attached to a scanning device that can point the assembly from $-5°$ to $+90°$ in elevation.

20. A lidar as defined in claim 19, wherein the laser transmitter has an output energy of $\approx 1$J per pulse, a pulse duration of about 25 ns and a pulse repetition rate of 0.1 to 0.2 Hz.

* * * * *